United States Patent
Lundberg et al.

(10) Patent No.: US 10,452,372 B2
(45) Date of Patent: Oct. 22, 2019

(54) METHOD AND DEPLOYMENT MODULE FOR MANAGING A CONTAINER TO BE DEPLOYED ON A SOFTWARE PLATFORM

(71) Applicant: TELEFONAKTIEBOLAGET LM ERICSSON (PUBL), Stockholm (SE)

(72) Inventors: Jonas Lundberg, Luleå (SE); Daniel Espling, Luleå (SE); Andreas Ekeroth, Södertälje (SE); Johan Kristiansson, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/533,077

(22) PCT Filed: Dec. 15, 2014

(86) PCT No.: PCT/SE2014/051503
§ 371 (c)(1),
(2) Date: Jun. 5, 2017

(87) PCT Pub. No.: WO2016/099346
PCT Pub. Date: Jun. 23, 2016

(65) Prior Publication Data
US 2017/0329588 A1    Nov. 16, 2017

(51) Int. Cl.
*G06F 8/60* (2018.01)
*G06F 9/445* (2018.01)
*G06F 8/70* (2018.01)

(52) U.S. Cl.
CPC .................. *G06F 8/60* (2013.01); *G06F 8/70* (2013.01); *G06F 9/44521* (2013.01)

(58) Field of Classification Search
CPC ..................................... G06F 8/60; G06F 8/70
See application file for complete search history.

(56) References Cited

U.S. PATENT DOCUMENTS 9,116,768 B1 *   8/2015   Sawhney .................. G06F 8/60
9,122,562 B1 *   9/2015   Stickle ...................... G06F 8/71
(Continued)

OTHER PUBLICATIONS

Rajdeep Dua et al., "Virtualization vs Containerization to Support PaaS," 2014 [retrieved on Jun. 6, 2019], IEEE International Conference on Cloud Engineering, pp. 610-614, downloaded from the Internet at <url>:https://ieeexplore.ieee.org. (Year: 2014).*

(Continued)

*Primary Examiner* — Thuy Dao
*Assistant Examiner* — Stephen D Berman
(74) *Attorney, Agent, or Firm* — Rothwell, Figg, Ernst & Manbeck, P.C.

(57) ABSTRACT

A method and a deployment module (110) for managing a container to be deployed on a software platform (120) are disclosed. The container provides a first set of functions. The deployment module (110) obtains (203) the container. The deployment module (110) obtains (204) a list specifying a second set of functions for the container. The deployment module (110) associates (205) the container, based on the list, with the second set of functions. The container, when deployed, provides the first and second set of functions when executed on the software platform (120). A corresponding computer program and a carrier therefor are also disclosed.

17 Claims, 4 Drawing Sheets

(56) References Cited

U.S. PATENT DOCUMENTS

| | | | | |
|---|---|---|---|---|
| 9,471,353 | B1* | 10/2016 | Christopher | G06F 9/44521 |
| 9,612,815 | B1* | 4/2017 | Jagtap | G06F 8/61 |
| 2006/0136401 | A1* | 6/2006 | Normington | G06F 9/44521 |
| 2006/0277537 | A1 | 12/2006 | Chan et al. | |
| 2008/0270986 | A1* | 10/2008 | Simeonov | G06F 8/60 717/120 |
| 2008/0301627 | A1 | 12/2008 | Stark | |
| 2010/0017792 | A1* | 1/2010 | Young | G06F 8/70 717/162 |
| 2011/0010701 | A1* | 1/2011 | Cooper | G06F 21/12 717/175 |
| 2011/0265081 | A1* | 10/2011 | Lucovsky | G06F 8/60 717/177 |
| 2012/0198442 | A1* | 8/2012 | Kashyap | G06F 8/61 718/1 |
| 2012/0233591 | A1 | 9/2012 | Thyagarajan et al. | |
| 2014/0082131 | A1* | 3/2014 | Jagtap | G06F 9/5072 709/217 |
| 2016/0092246 | A1* | 3/2016 | Lagerblad | G06F 9/44526 719/331 |
| 2017/0052807 | A1* | 2/2017 | Kristiansson | G06F 9/54 |

OTHER PUBLICATIONS

Mohamed Sellami et al., "PaaS-Independent Provisioning and Management of Applications in the Cloud," 2013 [retrieved on Jun. 6, 2019], IEEE Sixth International Conference on Cloud Computing, pp. 693-700, downloaded from the Internet at <url>:https://ieeexplore.ieee.org. (Year: 2013).*

David Bernstein et al., "Containers and Cloud: From LXC to Docker to Kubernetes," 2014 [retrieved on Jun. 6, 2019], IEEE Cloud Computing, vol. 1, Issue 3, pp. 81-84, downloaded from the Internet at <url>:https://ieeexplore.ieee.org. (Year: 2014).*

International Search Report with Written Opinion issued in Application No. PCT/SE2014/051503 dated Mar. 31, 2015, 8 pages.

Wikipedia: "Cloud Foundry", http://en.wikipedia.org/wiki/Cloud_Foundry; 2011, 5 pages.

Apcera: "The future of enterprise IT", https:www.apcera.com; Jan. 6, 2014, 4 pages.

Docker, Inc.: "What is Docker?", https://docs.docker.com; 2014, 2 pages.

Pendry J.S. and McKusick, M.K.: "Union Mounts in 4.4BSD-Lite", USENIX Conference Proceedings,1995, 15 pages.

SmartStack: "Service Discovery in the Cloud", http://nerds.airbnb.com, 2013, 23 pages.

Haff, G.: "The Road to Enterprise PaaS", OpenShift Enterprise; Whitepaper; www.redhat.com, 2012, 6 pages.

Openshift: "Develop, host, and scale your apps in the cloud", https://www.openshift.com, © 2014 Red Hat, 3 pages.

Wikipedia: "Microservices", http://en.wikipedia.org/wiki/Microservices, Dec. 20, 2014, 3 pages.

GitHub, Inc.: "Eureka at a glance", 2015, 4 pages.

* cited by examiner

METHOD AND DEPLOYMENT MODULE FOR MANAGING A CONTAINER TO BE DEPLOYED ON A SOFTWARE PLATFORM

CROSS REFERENCE TO RELATED APPLICATION(S)

This application is a 35 U.S.C. § 371 National Stage of International Patent Application No. PCT/SE2014/051503, filed Dec. 15, 2014, designating the United States, which is incorporated by reference.

TECHNICAL FIELD

Embodiments herein relate to computer systems, such as computer platforms provided as a service. In particular, a method and a deployment module for managing a container to be deployed on a software platform are disclosed. A corresponding computer program and a carrier therefor are also disclosed.

BACKGROUND

A growing sector of computer systems is that of cloud computing. Cloud computing is a general term that refers to any computer system delivering hosted services over the Internet. These services include at least so called Infrastructure-as-a-Service (IaaS) and Platform-as-a-Service (PaaS).

IaaS normally allows the developer to run any kind of application as long as it is bundled in a certain way. Normally, this means Virtual Machines (VMs), but more recently containers, such as provided by Docker which are discussed in more detail below, have been used as an alternative to VM.

A known IaaS is Amazon Web Services, which provides the developers, or end-users, with virtual server instances and storage, as well as application program interfaces (APIs) that allow the developers to start, stop, access and configure virtual servers and storage as required by their needs.

There exists a wide range of known PaaS. In the context of the cloud, PaaS is defined as a set of software development tools hosted on a provider's infrastructure, even an IaaS as above. Developers create applications on the provider's platform over the Internet. PaaS providers may use APIs, website portals or gateway software installed on the customer's computer. GoogleApps is a well-known example of PaaS.

Furthermore, concerning PaaS, computer systems is often a core function of a service, or function, of a complex system, like a business system, sales system, warehouse system, package tracking system etc.

A special kind of platforms for hosting such systems are provided as services. Thus, this kind of special platforms is often referred to as Platform-as-a-Service platforms (PaaS platform).

PaaS is a cloud platform that provides functionality to develop and deploy applications, for example providing support to provision and host databases, scale applications, or automatically restart broken software components. The applications and databases may constitute the backbone for the complex systems mentioned above.

Current state-of-the-art PaaS solutions, such as Cloud Foundry, OpenShift, and Apcera, are designed based on a monolithic architecture where dedicated components parts of the PaaS platform are responsible for managing deployed applications and providing PaaS functionality, e.g. scaling of an application. The nomenclature monolithic architecture refers to that underlying components of the platform are integrated with each other to form a core in which the underlying components are interwoven. Thus, the underlying components are not possible to separate.

There are several problems with such a design. For example, it is difficult to migrate an application and switch to another PaaS platform or provider. It is typically not supported, or at least not trivial, to setup a hybrid PaaS platforms, e.g. a federation of several PaaS providers. Sometime it can also be difficult to extend the PaaS platform with new functionality. It can also be hard to debug an application, as a new version of the application has to be uploaded to the PaaS in order to be tested.

While PaaS platforms offer easy-of-use and automation mechanism, it has recently become popular to build applications and web services using software containers. Docker, https://www.docker.com/whatisdocker/, is a popular technology used to build, ship and run any application as a lightweight container instead of using a virtual machine. A Docker container contains both the application and all its dependencies, which enables flexibility and portability making it easier to create distributed systems. Although software containers constitute a natural way to execute software on PaaS platforms, portability from one platform to a further platform normally requires adaption of the container to the further platform in order to use scaling and resilience function of the further platform.

As service-oriented architectures become more complex, a trend is to shift from monolithic architectures to so-called microservices architectures. Microservices make it possible to break down complex applications into small independent processes. In this way, it becomes possible to build highly decoupled systems, which consist of a large amount of microservices, each focusing on doing a relatively small task. Docker and software containers provide a way to isolate such processes and at the same time make it easy to develop and deploy new cloud services based on microservices.

Although microservices help simplify some problems with conventional PaaS platforms, e.g. making it easy to extend the application or scale separate parts of the application, the technology also introduces more complexity, and thus leaving more responsibility to the developers. To develop and use a distributed platform based on microservices as an alternative to a classical PaaS platform, it must be possible to easily locate and connect different components in the architecture with each other. For example, connecting a web server to a database without knowing where it will run in advance of deployment of the web server. This functionality is called service discovery and is a key component to implement a microservice based service-oriented architectures.

Service discovery can be implemented in many different ways where the easiest solution is to use static configurations, which will work for some cases, but which forces the service components to be deployed in a specific order. However, more advanced configuration methods such as service discovery becomes necessary as the architecture evolves and more services are added. In some cases, services might even be added on the fly and have a short lifetime, causing service locations to change dynamically.

Today many different solutions exist to solve the problem of dynamic service discovery, see for example SmartStack from Airbnb, http://nerds.airbnb.com/smartstack-service-discovery-cloud/. Normally, registering service locations to a registry server solves the problem of locating services. A client application can then query the registry server for information about the location of a certain service. One example of such discovery service is Netflix Eureka, https://github.com/Netflix/eureka, that consists of two applications; an Eureka client and an Eureka server. The Eureka server is a service registry where the Eureka client registers its services. The Eureka client is then embedded in the service source code. This means that the developer of the service source code must be aware of API for the Eureka client and the Eureka server.

Another example of using Airbnb's SmartStack is to set up a registry server to enable service discovery and registration. Apache Zookeeper is a centralized service for maintaining configuration information. SmartStack uses Zookeeper to handle service registration and a local proxy to route requests to available services. On top of Zookeeper and the proxy SmartStack has two processes called Nerve and Synapse to handle service registration and discovery. Nerve is responsible for registering services in Zookeeper and Synapse is responsible for re-configuring the locally running proxy with services registered in Zookeeper.

In order to create a microservice-based platform that is as easy to use as a conventional PaaS platform, developers should not have to care about service discovery, scaling or self-healing. Developers should just focusing on developing standard Docker containers, which can be tested and run on their local laptops like any other Docker container, and then deploy the containers to the platform. The platform will then automatically connect them together to a working application.

A problem is how to provide portability, without the need for services and components to be written in such way that they are aware of e.g. service discovery or health management mechanism and thus "talk the same language". SmartStack separates the registration and discovery mechanism from the service by putting requirements on the execution platform to provide certain functions. Another problem with existing solutions is service outages whenever the service registry entity or other crucial nodes are not responding.

SUMMARY

An objective may be to facilitate deployment of containers at a software platform, such as a PaaS platform of the above mentioned kind.

According to an aspect, the objective is achieved by a method, performed by a deployment module, for managing a container to be deployed on a software platform. The container provides a first set of functions. The deployment module obtains the container. The deployment module obtains a list specifying a second set of functions for the container. The deployment module associates the container, based on the list, with the second set of functions. The container, when deployed, provides the first and second set of functions when executed on the software platform.

According to another aspect, the objective is achieved by a deployment module configured to manage a container to be deployed on a software platform. The container provides a first set of functions. The deployment module is configured to obtain the container, and to obtain a list specifying a second set of functions for the container. Furthermore, the deployment module is configured to associate the container, based on the list, with the second set of functions. In this manner, the container, when deployed, provides the first and second set of functions when executed on the software platform.

According to further aspects, the objective is achieved by a computer program and a carrier for the computer program corresponding to the aspects above.

Thanks to that the deployment module associates the obtained container with the second set of functions, the second set of functions will be invoked seamlessly and automatic when the associated container is deployed and executed on the software platform. In this manner, containers may be provided with the second set of functions with little effort from a developer of containers, since the developer only needs to obtain, or create the list, before deployment.

Notably, the association of the second set of functions is performed with the container. This kind of association would not be feasible when using code in a Virtual Machine (VM) since it is typically more static and hard to modify. Software containers, such as Docker on the other hand, use a hierarchical file system, a so called union mounts, which makes it possible to stack multiple file system on top of each other in a stack. Reference is made to Pendry, Jan-Simon; Marshall Kirk McKusick, December 1995, "Union Mounts in 4.4BSD-Lite" and Proceedings of the USENIX Technical Conference on UNIX and Advanced Computing Systems: 25-33, retrieved 25 Nov. 2007, concerning mounts. In this way, it is possible to easily and efficiently extend a specific container image with additional components (files) without generating a whole new file system image as must be done with virtual machines images.

In a particular embodiment, a method for automatically and transparently inject the second set of functions into the container is provided. The second set of functions may handle service discovery, self-configuration, self-healing or the like. The second set of functions may further handle registration and how to find required services, possibly external services outside the container, without involvement from existing services, such as the first set of functions, inside the container. In this particular embodiment, facilitated portability across different platforms is achieved, since the container may have few, or even no, dependencies to the underlying platform, such as a cloud platform like Amazon, OpenStack, Mesos etc.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar features, such as nodes, actions, steps, modules, circuits, parts, items elements, units or the like, when applicable. In the figures, features that appear in some embodiments are indicated by dashed lines.

Figure 1:
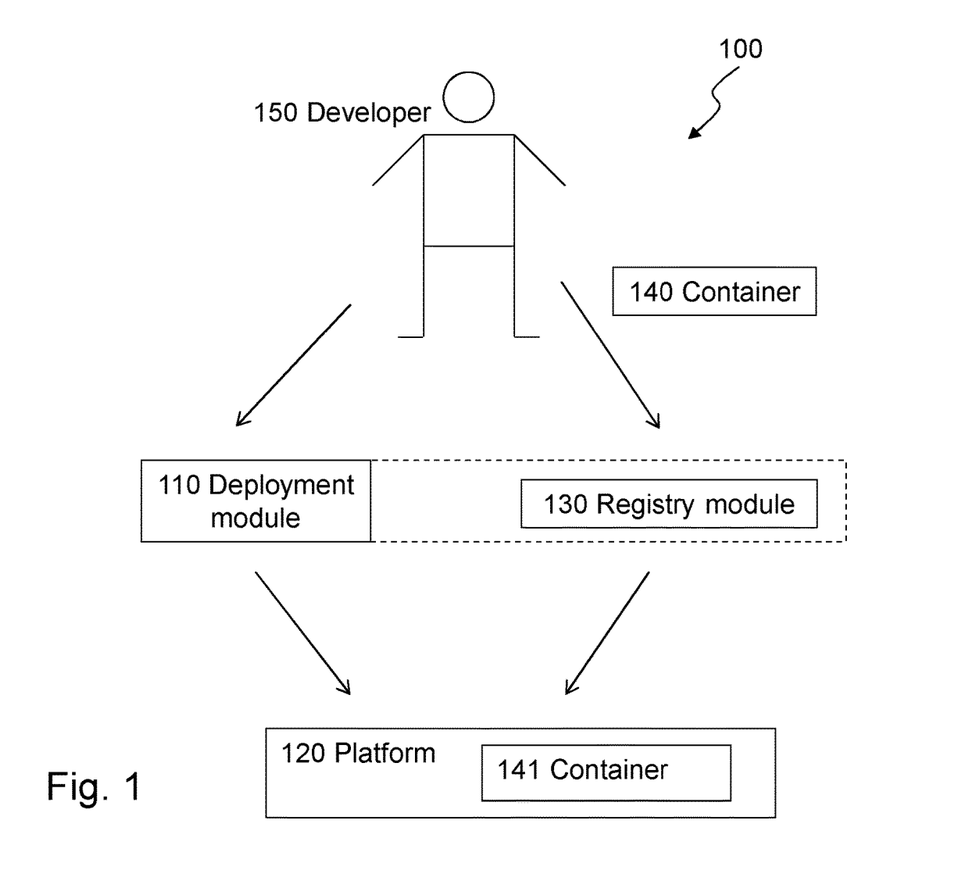
FIG. 1 is a schematic overview of an exemplifying system in which embodiments herein may be implemented.

FIG. 1 depicts an exemplifying system 100 in which embodiments herein may be implemented. In this example, the system 100 is a network of computers used for managing deployment of containers using e.g. Docker.

The system 100 includes a deployment module 110, a software platform 120, and a registry module 130. In some examples, the deployment module 110 comprises the registry module 130.

The deployment module 110 may be a software module for providing automatic and seamless deployment of containers at the software platform 120.

The software platform 120 may be a cloud platform, such as Docker, Mesos or the like. Moreover, the software platform may be Docker when executed locally on e.g. a desktop computer, laptop or the like.

The registry module 130 may be a server, which may host a data storage (not shown) including so called images of containers. The data storage may be a database, a file system or the like. The database may also be external to the registry module 130. Notably, the registry module 130 does not handle so called service registration and service discovery.

Furthermore, a container 140 and a new container 141 are shown in FIG. 1.

Moreover, a developer 150, or user, is illustrated. With the embodiments herein, deployment of containers is facilitated from the perspective of the developer 150.

In one example, in order to provide a short example of an embodiment herein, the developer 150 creates a container 140, or container image, and pushes the container image to the registry module 130. The identification of the container 140 is then sent to the deployment module 110, which will download the container 140 from the registry module 130. Next, the deployment module 110 creates a derivate of the container 140 with injected code. The container 140 with injected code is the new container 141. The deployment module 110 then uploads a new container 141 to the registry module 130. Then, the deployment module 110 triggers a deployment request to the software platform 120, e.g. a container runtime. This process is transparent and invisible to the developer 150, which simply instructs the deployment module 110 to deploy the container 140 and simply provides a list. The list will be described in greater detail below. In some examples, the injected code will provide self-management functionality such as service discovery.

Figure 2:
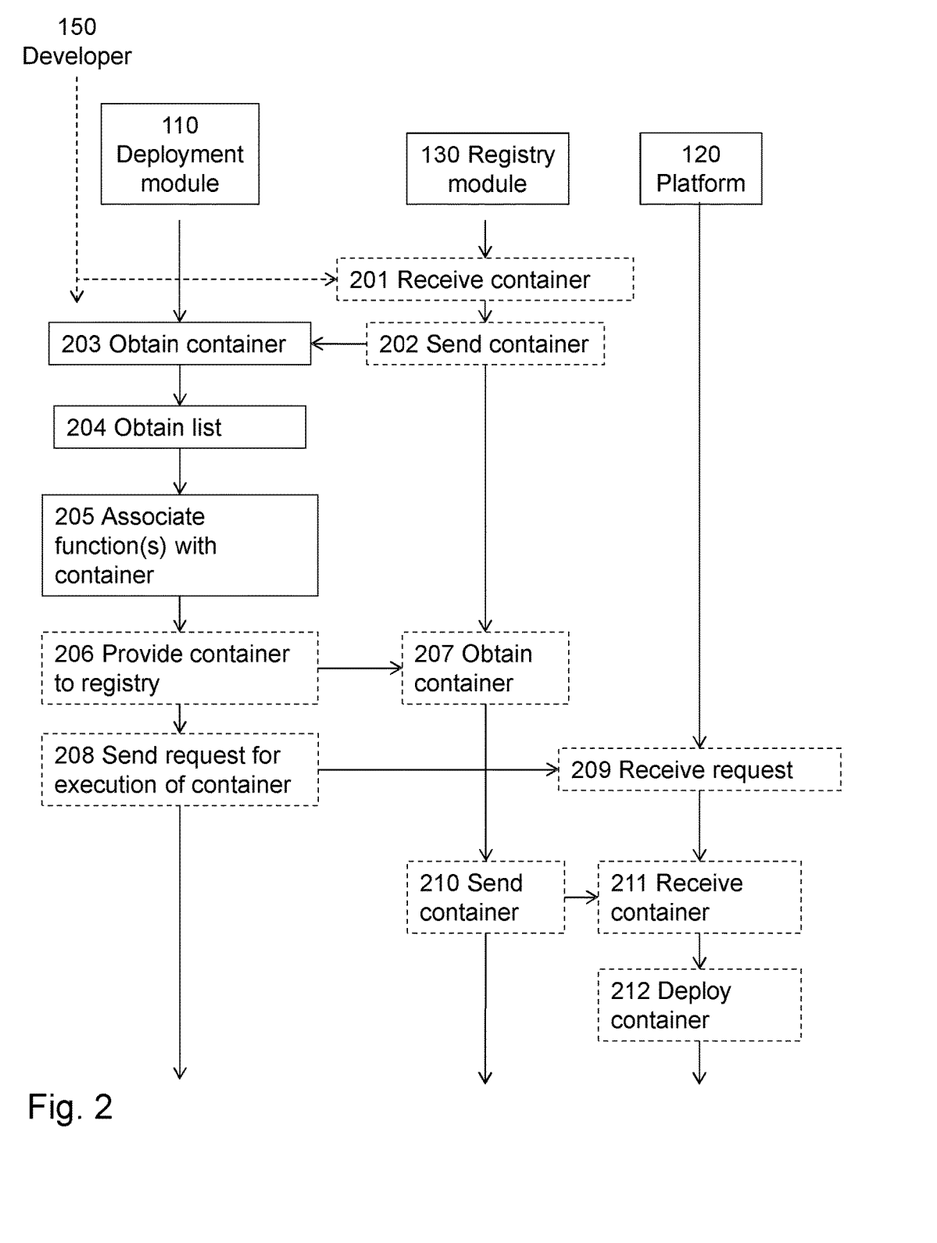
FIG. 2 is a combined signaling and flowchart illustrating the methods herein.

FIG. 2 illustrates an exemplifying method according to embodiments herein when performed in connection with the computer system 100 of FIG. 1. In this example, the deployment module 110 performs a method for managing a container to be deployed on the software platform 120. In other examples, the method for managing the container to be deployed on the software platform 120 may be performed in a distributed manner. That is to say, the method may be performed by a plurality of modules, or nodes, which may be distributed in a so called computing cloud, or cloud for short. As used herein, the term "deploy", "deployed" or "deployment" includes a process of making a container, i.e. software, available for use. The deployment thus includes installation of the container.

As mentioned, the container provides a first set of functions.

According to some embodiments herein, services, e.g. the first set of functions, may be subdivided into containers, wherein each container contains everything it needs to run, including system dependencies and service specific code.

Initially, the developer, or someone else, may have created a list. The list specifies a second set of functions. The list may also be downloaded from a server holding default or standard lists by the developer 150. The list may be a document with meta-data that describes the first set of functions, which may be associated with a service of the container. The list may contain a Uniform Resource Identifier (URI) to a pre-built container, or pre-built container image, as well as information needed to deploy the pre-built container. The pre-built container is referred to as the container in the actions below. The part of the list that is related to service registration and service discovery may include sections identifying provided services and required services. The provide services are provided by the container and the required services are so called external dependencies. For example, if deployment of a Web server that needs a database is to be performed, the list may specify a database on port 3306, just an exemplifying number, as required and then list the Web server on port 80 as provided.

Moreover, the deployment module 110 may receive the deployment request from the developer 150.

One or more of the following actions may be performed in any suitable order.

Action 201

The registry module 130 may receive the container from the developer 150.

Action 202

The registry module 130 may send the container to the deployment module 110, e.g. on request by the deployment module 110 or without such request. In examples, where the deployment module 110 comprises the registry module 130, this action is a mere internal sending, or providing, of the container before action 205.

Action 203

The deployment module 110 obtains the container. The obtained container may be provided with a first identification.

In some examples, the deployment module 110 may have received the container together with, or included in, the deployment request.

In other examples subsequent to action 202, the deployment module 110 may receive the container from the registry module 130.

In further examples, the deployment module 110 may receive the container from the developer 150.

Action 204

The deployment module 110 obtains a list specifying the second set of functions for the container. In some examples, the list may be included in the deployment request. The list may in some case be provided by the developer 150.

Action 204 may be performed before action 203.

In one application of the embodiments herein, the second set of functions may include self-management functions. Then, the embodiments herein provide a method where additional processes are automatically and seamlessly injected into the containers when they are deployed to manage service discovery, scaling, and health management.

In this context, functionality for self-management, such as service registration and discovery, is added automatically to the container in a transparent way, affecting neither developer nor existing services. It is simple to understand and it is easy to operate.

Accordingly, the self-management functions may comprise one or more of: a service registration function; a service discovery function; a monitoring function; an auto-recovery function; a load balancing function; an auto-scaling function; a status check function; a zero downtime upgrade function; and the like.

Action 205

The deployment module 110 associates 205 the container, based on the list, with the second set of functions. The container, when deployed, provides the first and second set of functions when executed on the software platform 120. This means that the container, when associated with the second set of functions, may be said to be an associated container, aka the new container 141.

In some examples, the deployment module 110 may provide the associated container with the first identification or a second identification.

The first identification may be used to identify the associated container when it is desired to reuse the first identification. The second identification may be used to identify the associated container when it is desired not to reuse the first identification.

By reusing the first identification, the injection process may become even more transparent to the developer 150, or end-user. As an example, the identifier may be translated from "testapplication/database" to "invention_project/testapplication-database". The developer 150 may see this by looking at a set of running containers in the software platform 120. In this case, the registry module 130 may in practice replace an original image of the container with an image of the associated container. Subsequent attempts to associate the second set of functions to the container would have to take potential earlier associations into account.

However, it is normally easier and quicker to use the second identification to identify the associated container. A reason for this is that, when the container with the first identification is retained, any subsequent associations may start for a clear image of the container, while not having to consider any previous associations.

In some embodiments, the deployment module 110 may associate the second set of functions with the container by injecting at least one software component into the container. The software component may provide the second set of functions. As an example, the deployment module 110 may inject for instance service registration and service discovery functions. Moreover, the deployment module 110 may change a bootstrap code of the container. As an example, a binary file representing an image of the container may be edited by inserting the second set of functions, or references thereto. In this manner, a new binary file representing another image relating to the associated container may be created.

In these embodiments, the deployment module 110 may inject the second set of functions with the container by linking at least one of said at least one software component for providing at least one function of the second set of functions to the container and/or by modifying the container to provide at least one other function of the second set of functions. In this manner, the modified container, aka the new container 141, includes the at least one other function of the second set of functions.

In further embodiments, a fact that the deployment module 110 may associate the container with the second set of functions may cause the associated container to perform the following actions, or steps, when the associated container is deployed or during deployment of the associated container.

Figure 3:
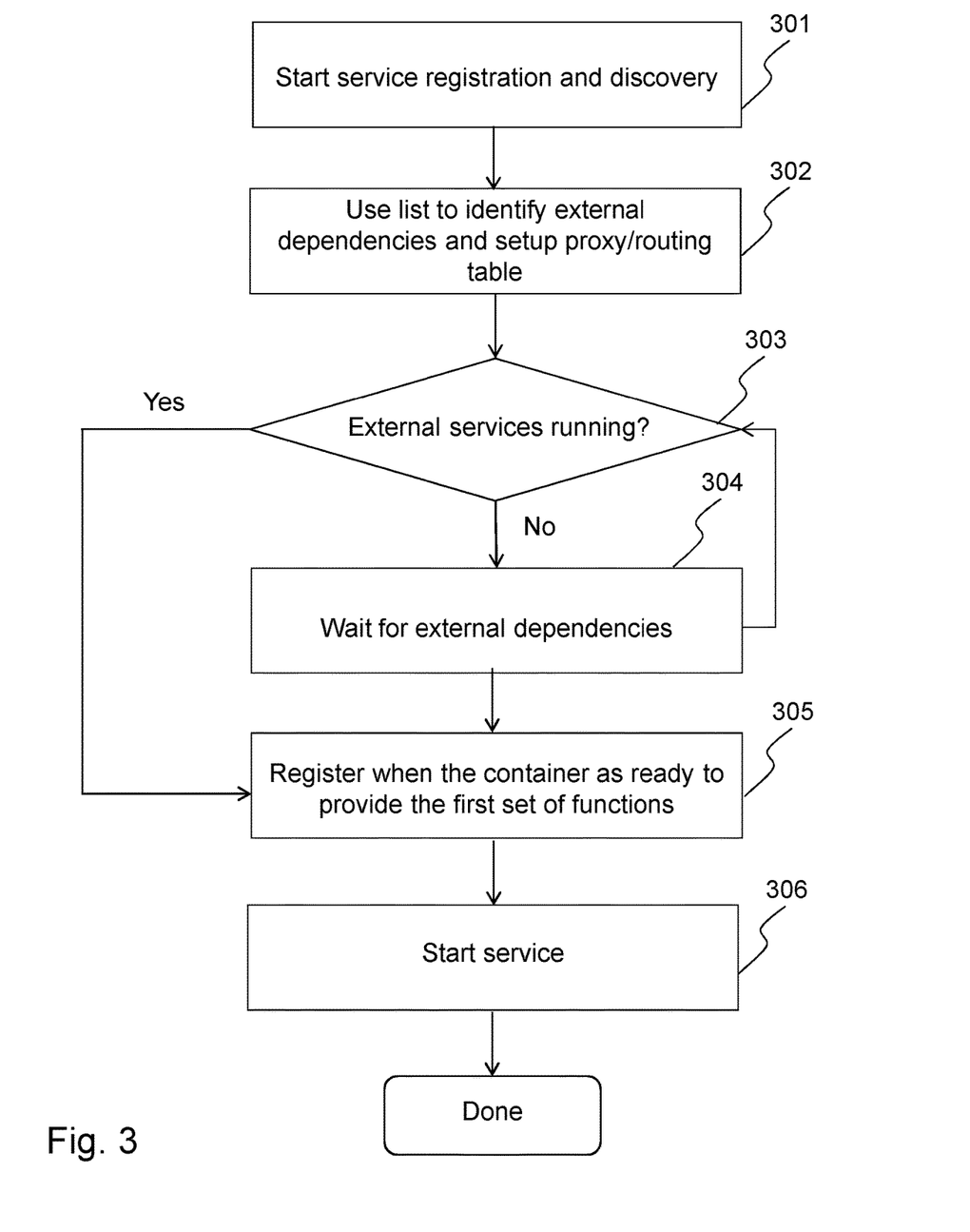
FIG. 3 is a flowchart illustrating actions performed by the deployment module during deployment.

The deployment module 110 may initially invoke, such as executes, the second set of functions. See also action 301 below.

The deployment module 110 may use the list to identify any existing external services, wherein the any existing external services are used by the container. See also action 302 below. When the container uses the external services or exchanges data with the external service, it may mean that the container calls one or more of the functions of the second set. In this way, execution of the second set of functions may be initiated by the container.

The deployment module 110 may wait for said any existing external services until said any existing external services found. See also action 303 and/or 304 below.

When said any existing external services are found, the deployment module 110 may register the container as ready for providing the first set of functions. See also action 305 below.

The deployment module 110 may start the first set of functions. See also action 306 below.

The list, including meta data, is used to customize the association process, e.g. the injection process, and to provide input data to the code, i.e. the second set of functions, that is injected. The list is not necessarily the same for all services and systems. As mentioned, this approach may be used to inject code for a wide range of self-management actions, e.g. monitoring, self-healing, load-balancing, health-checks or zero downtime upgrades.

Action 206

The deployment module 110 may provide the associated container to a registry module 130 for storing and managing containers. The deployment module 110 may thus send the associated container to the registry module 130. However, the deployment module 110 may in some cases send the associated container directly to the software platform 120, for example in conjunction with the request in action 208.

As an example, the associated container may be represented by a new extended container image, which may be stored by the registry module 130.

Action 207

The registry module 130 may obtain the associated container. E.g. the registry module 130 may receive the associated container from the deployment module 110.

Action 208

The deployment module 110 may send, to the software platform 120, a request for execution of the container, whereby the container may be deployed on the software platform 120.

The request may include a request for execution of the container provided with the first or second identification.

If action 206 is omitted, it is preferred that the request also includes the associated container.

In some examples, the request may be sent to the registry module 130, which then forwards the request and the container to the software platform 120.

Action 209

Subsequent to action 208, the software platform 120 may receive, from the deployment module 110, the request.

Action 210

The registry module 130 may send the container to the software platform 120. Action 210 may or may not be performed in response to an inquiry from the software platform 120. The inquiry may then instruct the registry module 130 to send the container.

Action 211

Following action 210, the software platform 120 may receive, or download, the container from the registry module 130.

Action 212

The software platform 120 may deploy the container, e.g. install the container and begin execution thereof. During deployment the associated container may be caused to perform the actions illustrated in FIG. 3.

According to some embodiments herein, for example when the second set of functions includes self-management functions, it becomes possible to move containers between different cloud providers, or even build a platform where an application physically runs on different providers while being perceived logically as one application. This could be beneficial when targeting industries having high security requirements and some services are only allowed to run on dedicated hardware owned by a specific company.

The embodiments herein enable creation of a distributed PaaS platform, as an example of the software platform 120. Instead of relying on centralized components to manage the PaaS, the PaaS components such service discovery can be injected into the containers so that the containers themselves together built up functions normally residing in the software platform 120.

Thanks to that dependency on the software platform 120 is reduced, development time may also be reduced, since no or very little time need to be spend on how to deploy the container. The container may even be deployed locally, using Docker. When the container is deployed locally, debugging etc. is facilitated.

As a consequence thereof, the software platform 120, e.g. an underlying cloud platform, may be kept simple and will be easier to install and manage.

Now turning to FIG. 3, a schematic flowchart of an exemplifying method performed by the associated container 141 is shown. In this example, the second set of functions includes self-management functions, such as service registration and service discovery. This means amongst other that a service to be registered and/or discovered provides the first set of functions.

One or more of the following actions may be performed in any suitable order when, or during, deployment of the container.

Action 301

A so called bootstrap sequence of the container, i.e. the obtained container in action 203, has been altered in such way that the second set of functions is started first. The obtained container includes a so called image, which has been altered. The altered image relates to the associated container in action 205.

The associated container 141 may thus start processes like service registration and service discovery when executed on the software platform 120. These processes are responsible to determine when the original bootstrap sequence of the obtained container may begin.

Action 302

The associated container 141 may use the list to determine how to configure outgoing proxy/routing table to make external dependencies reachable from a specific internal address. An example relating to the proxy/routing table is provided below.

Action 303

The associated container 141 may check whether any external dependencies are running. This means that the list also specifies whether the original bootstrap code, i.e. the bootstrap code of the container obtained in action 203, should be started immediately or be delayed until the external dependencies are ready.

Action 304

The associated container 141 may wait for any existing external dependencies when appropriate. Whenever an external service is ready the local proxy/routing table will be updated.

Action 305

The associated container 141 may register the container as ready for providing the first set of functions. For example, the obtained container may be associated with a service. Then, action 305 may be that the deployment module 110 registers the service with a dedicated server in which connectivity information is managed. For example, the dedicated server may be located in an Over-The-Top (OTT) network and the connectivity information may be used by client applications in the OTT network when attempting to access the service. Thus, client application will be able to located, e.g. find, the service. Each container may thus delay publishing of their own external services until they have successfully found and resolved all services they depend on. Assume service A depends on B, and B depends on C. Service A will not be able to see B in among external services, available to services executing in the software platform, until B has successfully found and connected to C. In this manner, B may be assumed to be fully operational if it is visible and A will be able to start its original commands, i.e. according to the container obtained in action 203, as soon as B has been found.

Action 306

The associated container 141 may start the first set of functions. When the bootstrap procedure of the first set of functions is ready the second set of functions remains running, e.g. while being responsible for self-management such as scaling and self-healing.

Example Relating to Proxy/Routing-Table

Let's assume a container comprises a database client that has been preconfigured to communicate with a database server at IP: 100.100.100.100 and port 3306. In this case, there are two options; either require the application owner to adapt the script and use variables such as $DATABASE_HOST and $DATABASE_PORT instead of the hard coded values. These variables may then be adapted during the association action above, i.e. these variables may then be set to the actual location of the database servers during the self-discovery process. Another option is to leave the client as-is, and instead dynamically create a proxy or rerouting functionality to make the address of 100.100.100.100 actually resolve to the real address of the database, for within the context of the container only.

This may be done by IP-level rerouting (e.g IP-tables), but similar effects may be achieved by relying on dynamic hostname resolution (DNS), at least in the case of hostname being used instead of IP-addresses. Virtual private networks, (VPNs), or potentially using the upcoming technique of software defined networking (SDNs) may both be used to create an internal address space for the container and the server. In this example, IP-level rerouting is used as this may cover both the full range of IP-addresses and DNS names and for ease of configuration.

To conclude, the proxy/routing table enables hosting of very many types of containers with preconfigured communication settings without adapting the applications running inside those containers at all.

To deploy a complex system that is consisting of several microservices, each provided by means of one or more containers, a common namespace is used. Even a global undefined namespace is still a namespace. Microservices can then be deployed individually and still be able to find other services within the same namespace as long as they have connectivity with an external endpoint, such as a dedicated server or distributed hash-table, and with each other. Multiple namespaces allow several microservice deployments to share the same platform without interfering with each other. A purpose of the dedicated server or distributed hash-table is to make it possible for client applications, e.g. in a OTT network, to find the service, such as the microservices. The service may include the first set of functions provided by the associated container.

Figure 4:
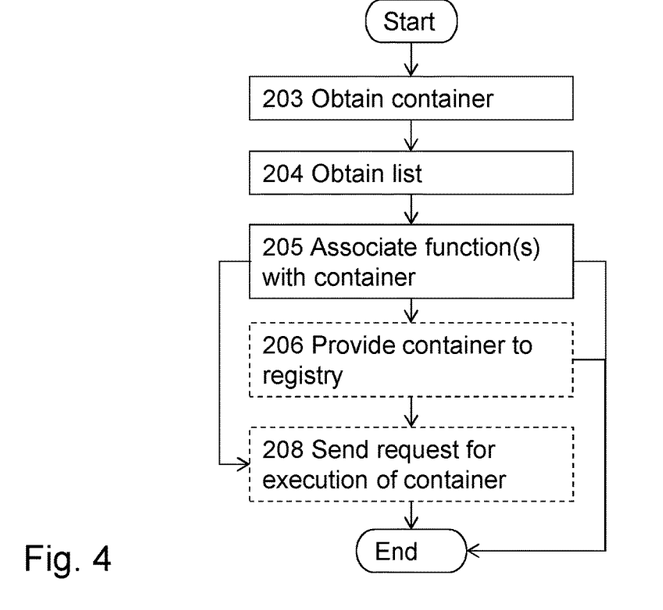
FIG. 4 is another flowchart illustrating embodiments of the method in the deployment module.

In FIG. 4, a schematic flowchart of exemplifying methods in the deployment module 110 is shown. Again, the same reference numerals as above have been used to denote the same or similar features, in particular the same reference numerals have been used to denote the same or similar actions. Accordingly, the deployment module 110 performs a method for managing a container to be deployed on a software platform 120. As mentioned, the container provides a first set of functions.

One or more of the following actions may be performed in any suitable order.

Action 203

The deployment module 110 obtains 203 the container.

Action 204

The deployment module 110 obtains a list specifying a second set of functions for the container.

The second set of functions may include self-management functions.

The self-management functions may comprise one or more of: a service registration function; a service discovery function; a monitoring function; an auto-recovery function; a load balancing function; an auto-scaling function; a status check function; a zero downtime upgrade function; and the like.

Action 205

The deployment module 110 associates the container, based on the list, with the second set of functions. The container, when deployed, provides the first and second set of functions when executed on the software platform 120.

The obtained container may be provided with a first identification, wherein the associating 205 of the container with the second set of functions may comprise providing the associated container with the first identification or a second identification.

The associating 205 may comprise injecting at least one software component for providing the second set of functions into the container.

The injecting of at least one software component may comprise linking at least one of said at least one software component for providing at least one function of the second set of functions to the container and/or modifying the container to provide at least one other function of the second set of functions, wherein the modified container includes the at least one other function of the second set of functions.

The associating 205 of the container with the second set of functions may cause the associated container to perform, when the associated container is deployed, the steps of:
 initially invoking 301 the second set of functions;
 using 302 the list to identify any existing external services, wherein the any existing external services are used by the container;
 waiting 303, 304 for said any existing external services until said any existing external services found;
 when said any existing external services are found, registering 305 the service; and
 starting 306 the first set of functions.

Action 206

The deployment module 110 may provide the associated container to a registry module 120 for storing and managing containers.

Action 208

The deployment module 110 may send, to the software platform 120, a request for execution of the container, whereby the container may be deployed on the software platform 120.

The request may include a request for execution of the container provided with the first or second identification.

Figure 5:
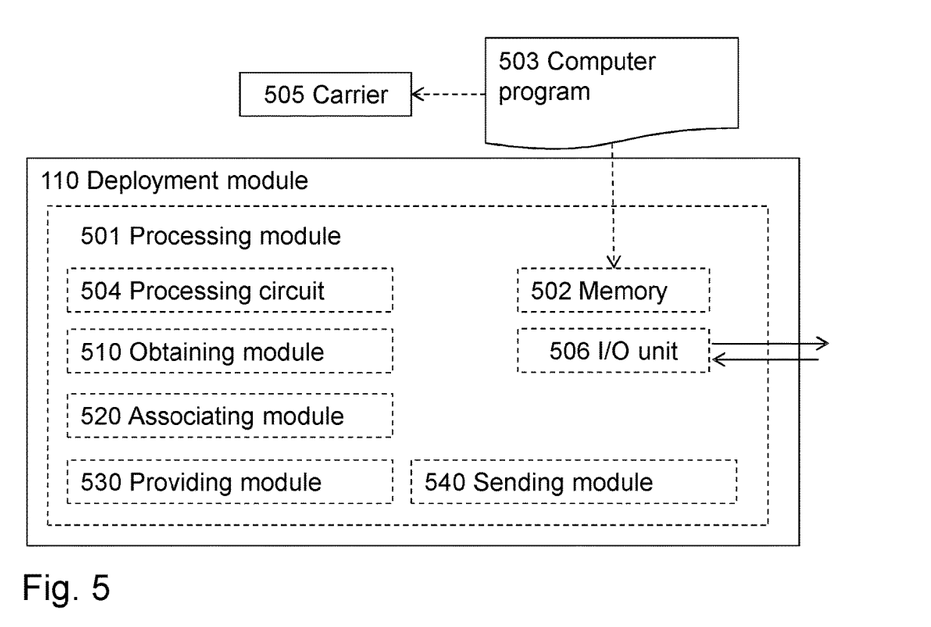
FIG. 5 is a block diagram illustrating embodiments of the deployment module.

With reference to FIG. 5, a schematic block diagram of embodiments of the deployment module 110 of FIG. 1 is shown. The deployment module 110 is thus configured to manage a container to be deployed on the software platform 120.

As mentioned, the container provides a first set of functions.

The deployment module 110 may comprise a processing module 501, such as a means, one or more hardware modules and/or one or more software modules for performing the methods described herein.

The deployment module 110 may further comprise a memory 502. The memory may comprise, such as contain or store, a computer program 503.

According to some embodiments herein, the processing module 501 comprises, e.g. 'is embodied in the form of or 'realized by', a processing circuit 504 as an exemplifying hardware module. In these embodiments, the memory 502 may comprise the computer program 503, comprising computer readable code units executable by the processing circuit 504, whereby the deployment module 110 is operative to perform the methods of FIG. 2 and/or FIG. 4.

In some other embodiments, the computer readable code units may cause the deployment module 110 to perform the method according to FIG. 2 and/or 4 when the computer readable code units are executed by the deployment module 110.

FIG. 5 further illustrates a carrier 505, or program carrier, which comprises the computer program 503 as described directly above.

In some embodiments, the processing module 501 comprises an Input/Output unit 506, which may be exemplified by a receiving module and/or a sending module as described below when applicable.

In further embodiments, the processing module 501 may comprise one or more of an obtaining module 510, an associating module 520, a providing module 530, and a sending module 540 as exemplifying hardware modules. In other examples, one or more of the aforementioned exemplifying hardware modules may be implemented as one or more software modules.

Therefore, according to the various embodiments described above, the deployment module 110, the processing module 501 and/or the obtaining module 510 is operative to, such as configured to, obtain the container.

The obtained container may be provided with a first identification. The deployment module 110, the processing module 501 and/or the providing module 530, may be operative to, such as configured to, provide the associated container with the first identification or a second identification.

The deployment module 110, the processing module 501 and/or the obtaining module 510, or a further obtaining module (not shown), is operative to, such as configured to, obtain a list specifying a second set of functions for the container.

The second set of functions may include self-management functions.

The self-management functions may comprise one or more of: a service registration function; a service discovery function; a monitoring function; an auto-recovery function; a load balancing function; an auto-scaling function; a status check function; a zero downtime upgrade function; and the like.

Moreover, the deployment module 110, the processing module 501 and/or the associating module 520 may be operative to, such as configured to, associate the container, based on the list, with the second set of functions. In this manner, the container, when or after deployment, provides the first and second set of functions when executed on the software platform 120.

The deployment module 110, the processing module 501 and/or the associating module 520, or an injecting module (not shown), may be operative to, such as configured to, inject at least one software component for providing the second set of functions into the container.

The deployment module 110, the processing module 501 and/or the associating module 520, or a linking module (not shown), may be operative to, such as configured to, link at least one of said at least one software component for providing at least one function of the second set of functions to the container.

Alternatively or additionally, the deployment module 110, the processing module 501 and/or the associating module 520, or a modifying module (not shown), may be operative to, such as configured to, modify the container to provide at least one other function of the second set of functions. The modified container may include the at least one other function of the second set of functions.

The deployment module 110, the processing module 501 and/or the providing module 530, or a further providing module (not shown), may be operative to, such as configured to, provide the associated container to a registry module 130 for storing and managing containers.

The deployment module 110, the processing module 501 and/or the sending module 540 may be operative to, such as configured to, send, to the software platform 120, a request for execution of the container, whereby the container is deployed on the software platform 120.

The request may include a request for execution of the container provided with the first or second identification.

The deployment module 110, the processing module 501 and/or the associating module 520, may be operative to, such as configured to, associate the associated container with the second set of function, wherein the associated container may be configured to:

initially invoke the second set of functions;

use the list to identify any existing external services, wherein the any existing external services are used by the container;

wait for said any existing external services until said any existing external services found;

when said any existing external services are found, register the container as ready for providing the first set of functions, e.g. as an external service; and start the first set of functions.

As used herein, the term "node" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments are implemented in a distributed manner.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file, a script or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of", such as set of devices, may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A deployment module, wherein the deployment module comprises:
   a memory; and
   processing circuitry coupled to the memory, wherein the processing circuitry is configured to:
   obtain an original binary file representing an image of an original container, wherein the original container comprises first bootstrap code and the original container is configured such that when the original container is deployed the first bootstrap code is immediately executed;
   obtain information specifying second bootstrap code for the original container and indicating that the execution of the first bootstrap code should be delayed; and
   produce, based on the original binary file and the information specifying the second bootstrap code, a modified binary file representing a modified container, wherein producing the modified binary file comprises adding to the original binary file one of the second bootstrap code and a reference to the second bootstrap code such that the modified binary file comprises the first bootstrap code and one of the second bootstrap code and the reference to the second bootstrap code, wherein the modified container is configured such that when the modified container is deployed the second bootstrap code is executed before the first bootstrap code.

2. The deployment module of claim 1, wherein producing the modified binary file comprises adding to the original binary file the second bootstrap code.

3. The deployment module of claim 1, wherein producing the modified binary file comprises adding to the original binary file the reference to the second bootstrap code.

4. The deployment module of claim 1, wherein the original container is provided with a first identification, wherein the deployment module is configured to provide the modified container with the first identification or a second identification.

5. The deployment module of claim 1, wherein the second bootstrap code includes self-management functions.

6. The deployment module of claim 5, wherein the self-management functions comprises one or more of:
   a service registration function;
   a service discovery function;
   a monitoring function;
   an auto-recovery function;
   a load balancing function;
   an auto-scaling function;
   a status check function; and
   a zero downtime upgrade function.

7. The deployment module of claim 1, wherein the deployment module is configured to send, to a software platform, a request for execution of the modified container, whereby the modified container is deployed on the software platform.

8. The deployment module of claim 7, wherein the request includes a request for execution of the modified container provided with the first or second identification.

9. The deployment module of claim 1, wherein the deployment module is configured to provide the modified container to a registry module for storing and managing containers.

10. The deployment module of claim 1, wherein the modified container is configured to:
    use the information to identify any existing external services, wherein the any existing external services are used by the modified container;
    wait for said any existing external services until said any existing external services found;
    when said any existing external services are found, register the modified container as ready for providing the first bootstrap code; and
    start the first bootstrap code.

11. A computer program product comprising a non-transitory computer readable medium storing a computer program comprising computer readable code units which when executed on a deployment module causes the deployment module to perform a method comprising:
    obtaining an original binary file representing an image of an original container, wherein the original container comprises first bootstrap code and the original container is configured such that when the original container is deployed the first bootstrap code is immediately executed;
    obtaining information specifying second bootstrap code for the original container and indicating that the execution of the first bootstrap code should be delayed; and
    producing, based on the original binary file and the information specifying the second bootstrap code, a modified binary file representing a modified container, wherein producing the modified binary file comprises adding to the original binary file one of the second bootstrap code and a reference to the second bootstrap code such that the modified binary file comprises the first bootstrap code and one of the second bootstrap code and the reference to the second bootstrap code, wherein the modified container is configured such that when the modified container is deployed the second bootstrap code is executed before the first bootstrap code.

12. A method, the method comprising:
    obtaining an original binary file representing an image of an original container, wherein the original container comprises first bootstrap code and the original container is configured such that when the original container is deployed the first bootstrap code is immediately executed;
    obtaining information specifying second bootstrap code for the original container and indicating that the execution of the first bootstrap code should be delayed; and
    producing, based on the original binary file and the information specifying the second bootstrap code, a modified binary file representing a modified container, wherein producing the modified binary file comprises adding to the original binary file one of the second bootstrap code and a reference to the second bootstrap code such that the modified binary file comprises the first bootstrap code and one of the second bootstrap code and the reference to the second bootstrap code, wherein the modified container is configured such that when the modified container is deployed the second bootstrap code is executed before the first bootstrap code.

13. The method of claim 12, wherein producing the modified binary file comprises adding to the original binary file the second bootstrap code.

14. The method of claim 12, wherein producing the modified binary file comprises adding to the original binary file the reference to the second bootstrap code.

15. The method of claim 12, further comprising sending to a software platform a request for execution of the modified container.

16. The method of claim 12, further comprising providing the modified container to a registry module for storing and managing containers.

17. The method of claim 12, wherein the modified container is configured to:
   use the information to identify any existing external services, wherein the any existing external services are used by the modified container;
   wait for said any existing external services until said any existing external services found;
   when said any existing external services are found, register the modified container as ready for providing the first bootstrap code; and
   start the first bootstrap code.

\* \* \* \* \*